United States Patent [19]

Sanford

[11] 4,167,090
[45] Sep. 11, 1979

[54] KNOCK-DOWN TRUSS STRUCTURE

[76] Inventor: Arthur C. Sanford, 2308 Bay Dr., Hillsboro Shores, Pompano Beach, Fla. 33062

[21] Appl. No.: 900,180

[22] Filed: Apr. 26, 1978

[51] Int. Cl.$^2$ ............................................. E04B 1/32
[52] U.S. Cl. ................................................. 52/641
[58] Field of Search ................. 52/693, 641, 639, 645, 52/66, 640, 643

[56] References Cited
U.S. PATENT DOCUMENTS

| | | | |
|---|---|---|---|
| 1,192,027 | 7/1916 | Acheson | 52/639 X |
| 2,386,077 | 10/1945 | Van Norman | 52/641 |
| 2,982,055 | 5/1961 | Thompson | 52/643 |
| 4,030,256 | 6/1977 | Ollman | 52/643 |

Primary Examiner—Carl D. Friedman
Attorney, Agent, or Firm—Hamilton, Renner & Kenner

[57] ABSTRACT

A knock-down roof truss structure having a top chord comprising a composite rafter and a bottom chord or tie member connected to the top chord by one or more web members, the heel portion of the rafter being connected to the tie member at the point where the load is transferred to the bearing support for the truss. At least one collapsible suspension web member connects each rafter to said tie member.

6 Claims, 6 Drawing Figures

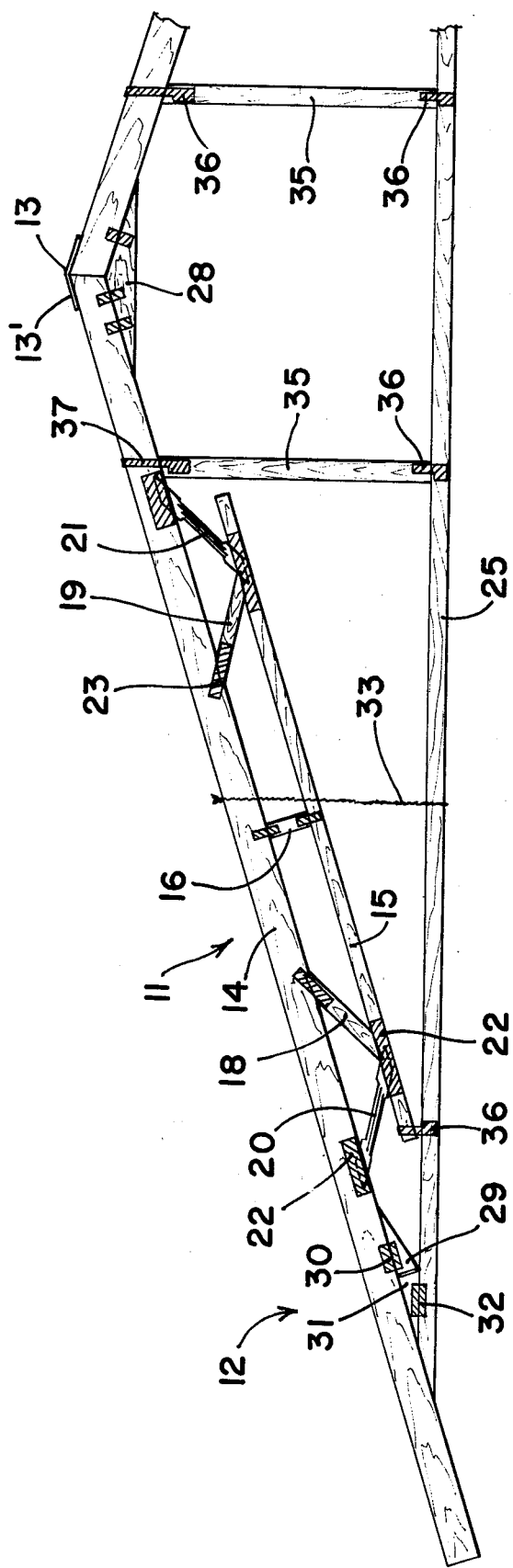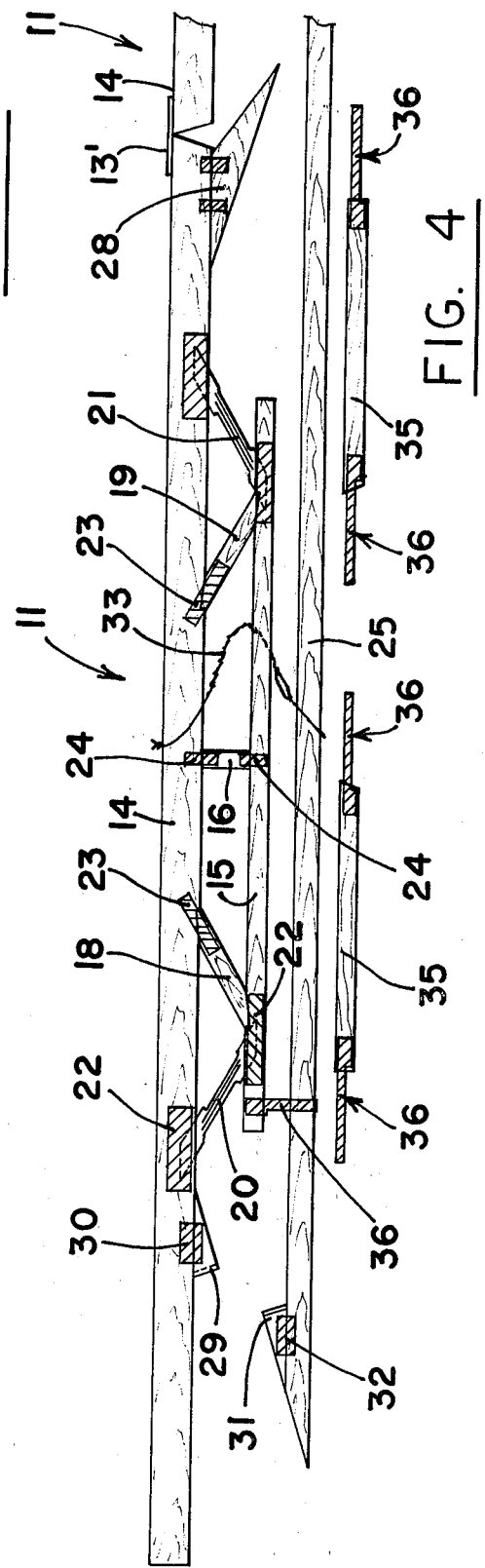

KNOCK-DOWN TRUSS STRUCTURE

BACKGROUND OF THE INVENTION

This invention relates to the type of roof structure disclosed in my copending application Ser. No. 849,779, filed Nov. 9, 1977, and entitled Roof Structure. Said structure has a top chord comprising at least one composite rafter having upper and lower chord members and a horizontal tie member connected to the rafter at the heel joint and forming a peaked or triangular truss, with a distinct tension member interconnecting the rafter chord members at the heel portion of the rafter. For trusses of increased spans one or more suspension web members are provided rigidly interconnecting the rafter and the horizontal tie member of the truss.

Such a structure is assembled prior to shipment by permanently connecting the chords and web members at the joints by means of toothed plates having their teeth embedded under pressure into the wood at the joints. Thus, such trusses are shipped in finished triangular configuration occupying excessive space and causing difficult and expensive handling before reaching the job site.

SUMMARY OF THE INVENTION

The present invention provides a knock-down construction for trusses having composite rafter members, whereby the various members can be shipped knocked-down in a flat elongated package of relatively low height and quickly and easily assembled at the job site using a few simple connectors which can be applied with an ordinary hand hammer.

It is an object of the present invention to provide a simple and inexpensive knock-down truss construction.

Another object is to provide an improved knock-down truss construction employing a minimal number of inexpensive connectors adapted to be applied with a hand hammer to completely and rapidly assemble the truss in the field.

BRIEF DESCRIPTION OF DRAWINGS

FIG. 3 is an enlarged partial view similar to FIG. 1.

FIG. 4 is an enlarged partial view similar to FIG. 2.

DESCRIPTION OF A PREFERRED EMBODIMENT

Figure 1:
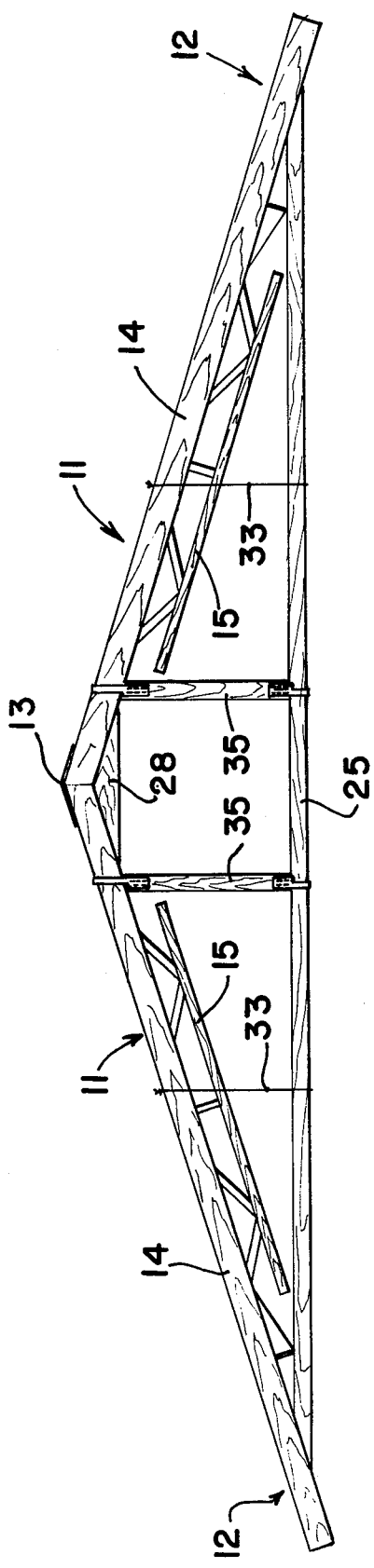
FIG. 1 is a side elevational view of a rafter truss embodying the invention in fully assembled condition.

In the truss shown in the drawings, the truss has opposed composite rafter members indicated generally at 11, the heel portions 12 of which are adapted to be supported from spaced bearing walls (not shown). The rafter members 11 converge upwardly to a ridge connection 13. Each rafter member 11 has laterally spaced, preferably parallel, upper and lower wood chord members 14 and 15, the upper ends of the upper chord members 14 abutting each other at the peak or ridge 13. Preferably, a small toothed plate 13' is applied over the peak joint and bends to an angle conforming to the tops of the chords 14 when erected.

The rafter members each have web members connecting the upper and lower chord members 14 and 15, and these may comprise transverse wood web members 16 and oblique wood web members 18 and 19. In accordance with my copending application Ser. No. 849,779, the oblique web members 20 at the lower ends of lower chord members 15 are tension members preferably of metal. Similar oblique metal web members 21 may be used at the upper ends of the lower chord members.

The web members 20 have apertured load transfer flanges at their ends which are secured to the sides of the chord members by means of toothed plates 22, the teeth of which mesh with the apertures and are embedded into the wood under pressure so as to maintain the load transfer flanges fixed with respect to the chord members to which they are secured. Similar toothed plates 23 of smaller area connect the ends of the wood web members 18 and 19 to the chord members 14 and 15.

A horizontal tie member 25 extends between the upper chord members 14 of the opposed composite rafters and is connected to the heel joint portions thereof. The sole function of tie member 25 is to resist the longitudinally outward directed thrust component of the roof load at the point where that load is transferred to the bearing walls.

As set forth in my copending application Ser. No. 849,779, the metal web member 20 is a discrete member which transfers the stresses in the lower chord member 15 of the rafter to the upper chord 14 so that the tie member 25 serves only to tie the heel portions of the rafters together to resist the outwardly directed thrust component of the roof load at the bearing supports.

The truss structure thus far described is more fully disclosed in said application Ser. No. 849,779, and per se forms no part of the present invention. It is noted that the truss structure of said application is fully assembled prior to shipment, using connector plates having teeth which are permanently embedded under pressure in the wood members, as a result of which the assembled trusses require substantial and expensive shipping space.

The present knock-down construction provides for maintaining the rafters separately intact in permanently assembled condition while bodily swinging them into parallelism with the horizontal tie member 25. As shown, the abutting upper ends of rafter chords 14 at the peak 13 are detachably held together by the toothed plate 13' and by means of a triangular wood block 28 which may be secured by toothed plates or spiked to both chords 14 with an ordinary hand hammer. In the knocked-down position the block preferably is secured to one chord as shown in FIG. 4, in position to be secured to the other when raised.

At the heel joints triangular blocks 29 are permanently secured to the undersides of chords 14 by toothed plates 30, and inter-abutting triangular blocks 31 are permanently secured to the upper sides of the tie member 25 by toothed plates 32. The blocks 31 may if desired be detachably secured to the chords 14 by toothed plates or by spikes driven upwardly through the tie member 25. Thus, the abutting faces of blocks 29 and 31 act to resist the outwardly directed thrust component applied to the rafters 11.

Figure 6:
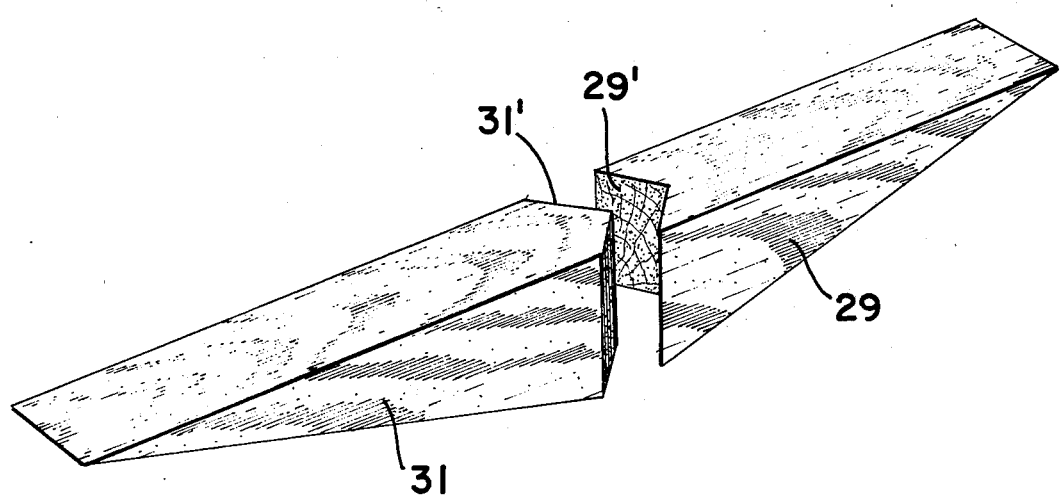
FIG. 6 is an enlarged perspective view showing how the blocks at the heel joint interfit.

As shown in FIG. 6, the abutting faces 29' and 31' of the blocks 29 and 31 are dovetailed to stabilize the joint against lateral forces.

In trusses of increasing spans, it may be necessary to have tension web members connecting the tie member to the rafters at intermediate points to support the suspended ceiling load on the tie member. The truss shown has flexible tension wires 33 medially of the peak and the heel joints and these wires may be snubbed or connected at their ends to spikes driven into the upper surfaces of the chords 14 and the under surface of the tie member. In longer spans additional tension wires may be used at intervals.

Figure 5:
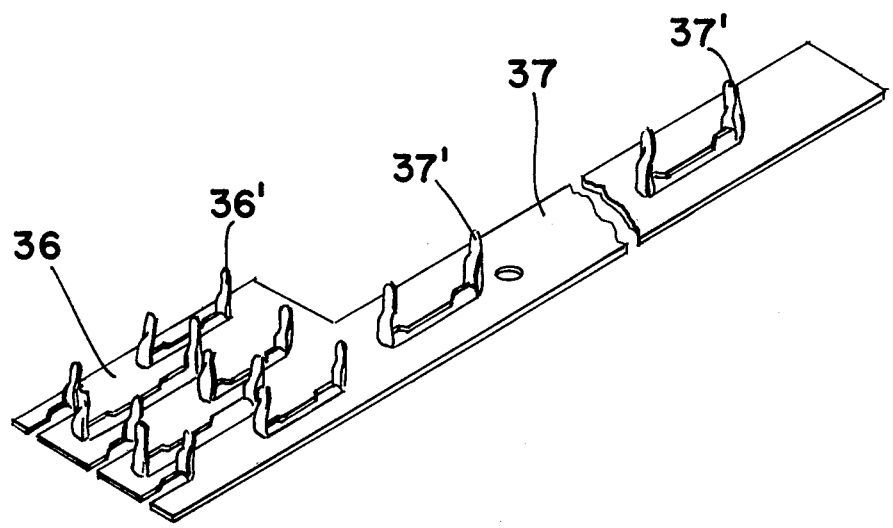
FIG. 5 is a perspective view of one of the strap connectors applied by a hand hammer to assemble the truss at the job site.

Also, the truss shown has vertical wood struts 35 interconnecting the upper chords 14 to the tie member 25 at points spaced laterally of the peak 13 to reinforce the tie member 25 while providing maximum storage space under the peak. The struts are detachably connected at their ends to the chords and the tie member by snubbing straps 36 having teeth 36' which are embedded in the struts and narrow strip portions 37 having two or three pairs of teeth 37'. See FIG. 5. The strips 37 are easily bent or snubbed around the tie member 25 and the chords 14 and the teeth on the strip portions embedded in the wood by one or two taps of a hand hammer. The bottom ends of chords 15 may also be detachably connected to the tie member 25 by additional straps 36 for lateral stability.

Figure 2:
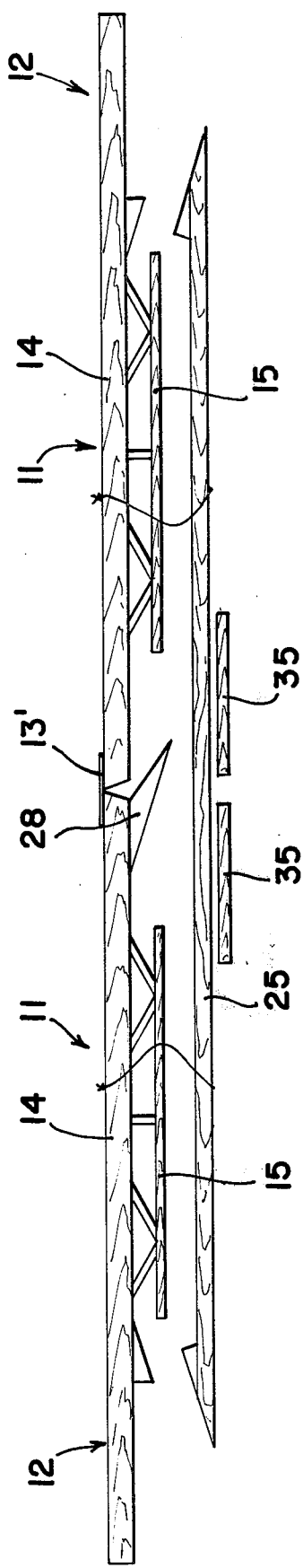
FIG. 2 is a side elevational view of the same truss in knocked-down condition.

In operation, the improved truss is manufactured and packaged for shipment in the knocked-down condition shown in FIGS. 2 and 4 with the rafters 11 per se permanently assembled and the wires 33 bent to place the rafters in horizontal position parallel to the tie member 25. The heel portions 12 of upper chords 14 have the blocks 29 secured thereto and the ends of tie member 25 have the blocks 31 secured thereto in proper relative position. The peak block 28 is preferably spiked to the upper end of one of the chords 14. The struts 35 are placed in horizontal position parallel to tie member 25, preferably between members 15 and 14 and with the wider portions of straps 36 secured to their ends. Similar straps 36 may be attached to the outer ends of chord members 15. This arrangement makes a relatively small and compact shipping package.

The trusses may be quickly and easily assembled at the job site by raising the two rafters 11 with the upper ends in abutment, thus straightening the wires 33, and then securing the block 28 in place, using an ordinary hand hammer. The tie member 25 is positioned with the blocks 29 and 31 in abutment by securing blocks 31 to the upper chords 14. The struts 35 may then be connected by snubbing or wrapping the strip portions 37 around the tie member 25 and the chords 14 and tapping the teeth of the straps with a hammer to embed them. The bottom ends of the chords 15 may be connected to the tie member 25 in a similar manner.

Accordingly, the truss can be assembled at the job site in a matter of a few minutes, using a hand hammer, and substantial handling and shipping expense has been obviated.

What is claimed is:

1. A knock-down truss structure adapted to be supported on spaced bearing walls and comprising opposed composite rafters; each rafter having an upper wood compression chord member, a lower wood tension chord member laterally spaced therefrom, and web members interconnecting said upper and lower chord members; said opposed rafters each having a heel portion adapted to be supported from said spaced bearing walls and converging upwardly therefrom; means detachably joining the upper ends of said rafters; a tie member detachably interconnecting the heel portions of said opposed rafters; inter-abutting blocks secured to the tie member and the heel portions of the rafters for resisting the outwardly directed thrust applied to the rafters, and at least one suspension web member detachably interconnecting each rafter with said tie member; whereby said rafters can be knocked down into close parallelism with said tie member.

2. A knock-down truss structure as defined in claim 1, wherein each suspension web member is a length of flexible wire connected at one end to said tension tie member and at the other end to one of said composite rafters.

3. A knock-down truss tructure as defined in claim 2, wherein each wire is connected at one end to the tension tie member and at the other end to the upper chord of one of said composite rafters.

4. A knock-down truss structure as defined in claim 1, wherein a separate and distinct tension member interconnects the upper and lower chord members of each opposed rafter at the heel portion thereof.

5. A knock-down truss structure as defined in claim 4, wherein the inter-abutting blocks have dovetailed inter-abutting faces to resist lateral forces.

6. A knock-down truss structure as defined in claim 1, wherein the inter-abutting blocks have dovetailed inter-abutting faces to resist lateral forces.

* * * * *